United States Patent
Cambois et al.

(10) Patent No.: US 7,860,487 B2
(45) Date of Patent: Dec. 28, 2010

(54) METHOD OF SECURELY UNLOCKING A MOBILE TERMINAL

(75) Inventors: Etienne Cambois, Cuges les Pins (FR); Olivier Benoit, Aubagne (FR)

(73) Assignee: Gemalto SA, Meudon (FR)

( * ) Notice: Subject to any disclaimer, the term of this patent is extended or adjusted under 35 U.S.C. 154(b) by 781 days.

(21) Appl. No.: 11/597,423

(22) PCT Filed: Apr. 26, 2005

(86) PCT No.: PCT/EP2005/051873
§ 371 (c)(1), (2), (4) Date: Sep. 7, 2007

(87) PCT Pub. No.: WO2005/117476
PCT Pub. Date: Dec. 8, 2005

(65) Prior Publication Data
US 2008/0125084 A1     May 29, 2008

(30) Foreign Application Priority Data
May 27, 2004   (FR)  .................................. 04 05734

(51) Int. Cl.
*H04M 1/66* (2006.01)
*H04M 3/00* (2006.01)
*H04K 1/00* (2006.01)

(52) U.S. Cl. .................. 455/411; 455/418; 713/168; 380/247

(58) Field of Classification Search ................ 455/411, 455/457, 458, 410, 550.1, 418–420; 380/23, 380/4, 9, 247; 713/168
See application file for complete search history.

(56) References Cited

U.S. PATENT DOCUMENTS

| | | | | |
|---|---|---|---|---|
| 5,850,445 A * | 12/1998 | Chan et al. | .................. | 380/247 |
| 6,124,799 A | 9/2000 | Parker | | |
| 6,314,283 B1 * | 11/2001 | Fielden | ........................ | 455/411 |
| 6,408,175 B1 * | 6/2002 | Park | ............................ | 455/411 |
| 7,630,495 B2 * | 12/2009 | Kiiveri et al. | ................ | 380/247 |
| 2004/0092248 A1 | 5/2004 | Kelkar et al. | | |

FOREIGN PATENT DOCUMENTS

FR     2 814 823 A     4/2002

OTHER PUBLICATIONS

International Search Report dated Sep. 21, 2005.

* cited by examiner

*Primary Examiner*—Lester Kincaid
*Assistant Examiner*—Kuo Woo
(74) *Attorney, Agent, or Firm*—Buchanan, Ingersoll & Rooney, P.C.

(57) ABSTRACT

A method of unlocking a mobile terminal after a period of use and ensuring that the first operator who sold the terminal receives adequate payment prior to the use thereof. The identity of the terminal is saved and a security algorithm, which is not known to the operator, is implemented in a security module which is introduced into a server that is managed by the operator. After the period of use, the security module determines a secret key which is obtained by applying the terminal identity transmitted thereby and an operator code to the security algorithm, following a request transmitted by the service entity. The determined secret key, which is encrypted at the terminal, is transmitted over the operator's radiocommunications network and decrypted in the mobile terminal so that it can be compared to the saved secret key in order for the mobile terminal to be unlocked when the compared secret keys are identical.

7 Claims, 3 Drawing Sheets

METHOD OF SECURELY UNLOCKING A MOBILE TERMINAL

The present invention relates to unlocking a mobile terminal in a digital cellular radio-communications network.

More particularly, the invention relates to improving the security of unlocking of a mobile terminal that an operator has sold at a very low price to a user in consideration for a subscription to the radio-communications network of the operator. For a predetermined term, e.g. for six months, following signing up for the subscription, the terminal is locked by the operator to its own radio-communications network and may request communications through the network of the operator only.

Currently, the operator locks the mobile terminal during a final stage of manufacture of the terminal. The operator orders a quantity of mobile terminals from the terminal manufacturer while transmitting to said manufacturer an operator identity code. That code is standardized, and each operator has a unique identity code. In the final stage of manufacture, the manufacturer locks the mobile terminals ordered by the operator by implementing therein a secret unlocking algorithm to which a terminal serial number and the operator code are applied so as to produce an unlocking code that is stored in a memory and that is associated with a lock requiring that calls go only via the network of the operator. Each mobile terminal thus has a manual unlocking function to which the unlocking code is applied by the user of the terminal in order to unlock the lock.

At the end of the predetermined term, the user of the mobile terminal must call a customer centre of the operator in order to request the unlocking code. Since the operator has the secret unlocking algorithm and knows the serial number of the terminal of the user in correspondence with the user's subscription telephone number and, naturally, since the operator knows its own operator code, said operator is capable of re-computing the unlocking code. The unlocking code is then transmitted to the user who inputs it into his or her mobile terminal in order to apply it to the secret algorithm implemented in the mobile terminal. The mobile terminal then compares the unlocking code as input with the unlocking code initially stored in the memory during the final stage of manufacture of said terminal. If the compared unlocking codes are identical, the mobile terminal is unlocked and the user can, for example, use it to sign up to a subscription with another radio-communications network operator.

The secret algorithm is often distributed directly or indirectly, e.g. via the Internet, and it is thus available to certain ill-intentioned users. Thus, after an ill-intentioned user has signed up to a subscription and without waiting for the end of the predetermined term, such a user can unlock the mobile terminal and decide to take out a subscription with another operator, and thus use the mobile terminal almost free of charge without the first operator who sold the mobile terminal to the user obtaining any return on its investment in said terminal, which it normally does precisely on expiry of the predetermined term. Such unlocking, repeated in numerous mobile terminals that the first operator has sold, constitutes a considerable shortfall for said first operator.

The object of the invention is to make it possible to unlock a mobile terminal only at the end of the predetermined term, and thus to secure sufficient revenue for the first operator during the predetermined term by means of the use of its network actually being imposed securely on the mobile terminal, without the user knowing the unlocking code. In addition, the administrations of certain countries require operators to perform systematic unlocking at the end of said term.

To this end, a method of unlocking a mobile terminal which, prior to being used, is assigned to a radio-communications network managed by an operator, and has stored in a memory a secret key resulting from applying an identity of the mobile terminal and a code of the operator to a security algorithm, the method comprising, after a predetermined term of use, inserting a secret key into the mobile terminal for comparison therein with the stored secret key, is characterized in that it further comprises the following steps:

prior to use, storing in a memory the identity of the mobile terminal and implementing the security algorithm that is unknown to the operator in a security module, and inserting the security module into a service entity that is managed by the operator and that communicates with the mobile terminal via at least the radio-communications;

after the predetermined term of use, in the security module, determining a secret key resulting from applying the terminal identity transmitted by the mobile terminal and the code of the operator to the security algorithm after an update request has been transmitted by the service entity, transmitting the enciphered determined secret key to the mobile terminal over the radio-communications network, and deciphering in the mobile terminal the enciphered secret key as inserted secret key so as to compare it with the stored secret key and so as to unlock the mobile terminal when the compared secret keys are identical.

Unlocking the mobile terminal is activated therein when the compared secret keys are identical, and said unlocking is caused over the radio-communications network of the first operator, i.e. through the Over The Air (OTA) radio interface, without requiring the determined secret key to be known to the user and without requiring said determined secret key to be input as the unlocking code.

The security of the unlocking of the mobile terminal is improved in the invention by means of the security algorithm being implemented in the security module by the terminal manufacturer who thus keeps the security algorithm secret from the operator.

In order to activate unlocking of the mobile terminal dependent on a parameter when the compared secret keys are identical, personal data including the determined secret key and a parameter may be transmitted enciphered from the service entity to the mobile terminal and may be deciphered in the mobile terminal.

In a more comprehensive implementation, the method of unlocking mobile terminal further comprises the following steps:

in the security module, applying the personal data and a first random number, transmitted with the terminal identity by the mobile terminal, to an algorithm having as its key the determined secret key so as to generate a first message authentication code in order to transmit the enciphered personal data and the message authentication code from the service entity to the mobile terminal; and in the mobile terminal, generating a first message authentication code, comparing the generated and transmitted first message authentication codes instead of comparing the secret keys, and deciphering and interpreting the enciphered personal data when the compared authentication codes are identical.

The personal data may include at least a portion of the identity of the mobile terminal and a parameter in order to activate unlocking of the mobile terminal that is dependent on the parameter when the compared authentication codes are identical.

In this more comprehensive implementation, the determined secret key is not transmitted unencrypted by the security module to the mobile terminal. Updating the personal data is subject to verification of the first message authentication code in the mobile terminal. It is not possible to unlock the terminal or to accomplish other actions in the terminal without knowing the secret key and the security algorithm. The first random number remedies attacks on personal data that could cause unlocking to take place.

In addition, security is further improved by means of the secret key and the security algorithm that are the property of the manufacturer of the mobile terminal and that are unknown to the operator, unlike the personal data and the algorithm for the authentication code that are the property of the operator and that are unknown to the manufacturer of the mobile terminal.

The secret key prevents any ill-intentioned person who does not have the security algorithm from being able to unlock the mobile terminal. The secret key, in combination with the first random number transmitted by the mobile terminal, is transformed into an authentication code, thereby preventing any third party other than the first operator who sold the mobile terminal from unlocking said terminal, and thus from updating the personal data in the mobile terminal.

In a variant, the user may request unlocking of the mobile terminal. In which case, after the predetermined term of use, an unlock request message is transmitted from the mobile terminal to the security module so that the security module requests transmission of the identity to the terminal.

Preferably, the unlocking or any other action caused in the mobile terminal by the security module is confirmed to said security module. The method then further comprises the following steps:

generating a second random number in the security module and transmitting it with at least the secret key or a first message authentication code dependent on the secret key to the mobile terminal;

when the compared secret keys or compared first message authentication codes are identical in the mobile terminal, generating a second message authentication code resulting from applying the personal data and the second random number to an algorithm having the secret as its key, and transmitting the terminal identity and the second message authentication code from the mobile terminal to the service entity; and in the security module, generating a second authentication code and comparing it with the transmitted second authentication code.

Other characteristics and advantages of the present invention will appear more clearly on reading the following description of preferred embodiments of the invention given by way of non-limiting example and with reference to the corresponding accompanying drawings, in which.

Figure 1:
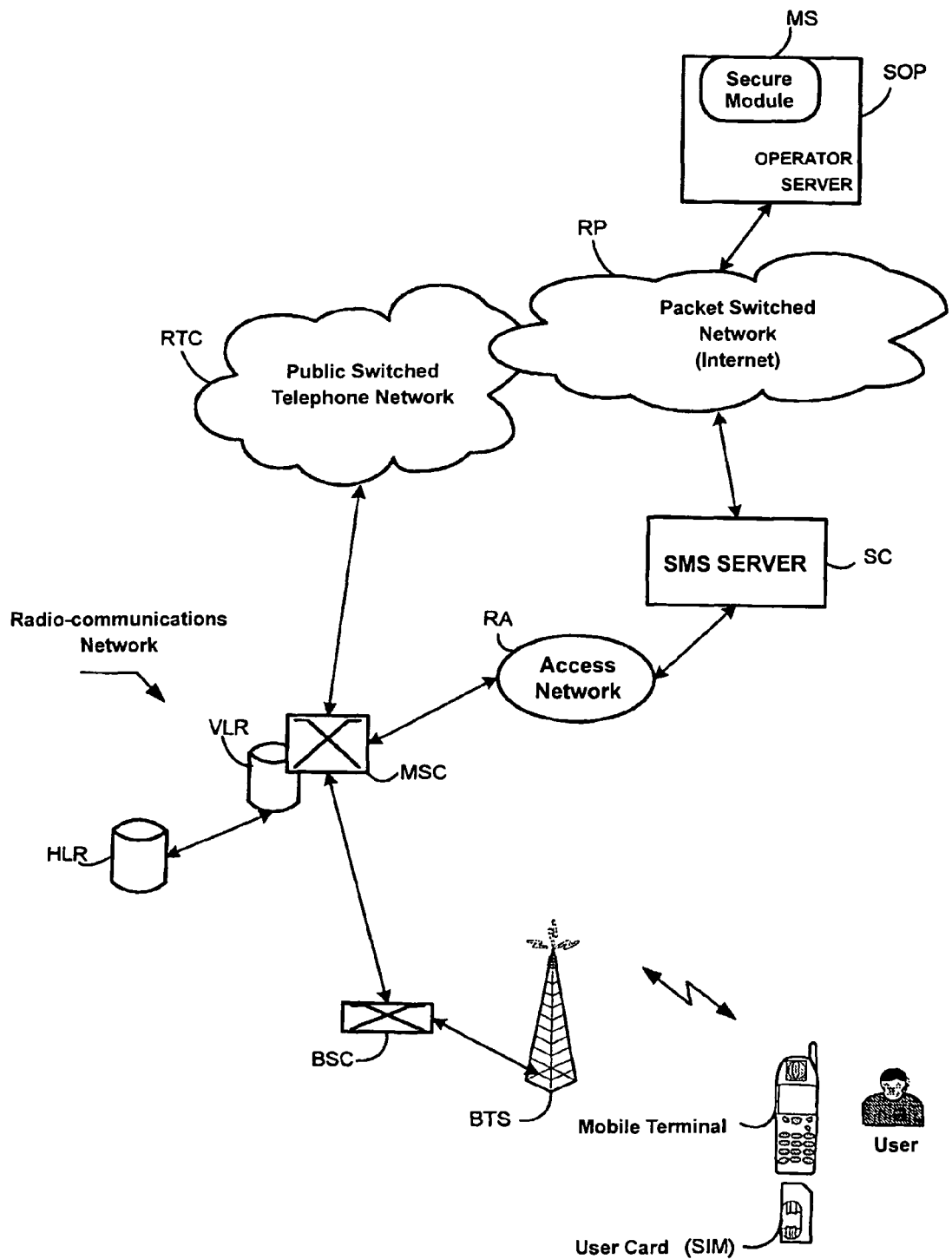
FIG. 1 is a block diagram showing a telecommunications link between an operator server having a secure module and a mobile terminal for implementing the unlocking method.

With reference to FIG. 1, a mobile radio terminal TM equipped with a removable user card CU of the Universal Integrated Circuit Card (UICC) type, also referred to as a Subscriber Identity Module (SIM) card in the Global System for Mobile Communications (GSM), is supplied to a user US by a first operator who operates a digital cellular radio-communications network RR. For example, the radio-communications network RR is of the GSM type. FIG. 1 shows only the main elements of that location zone of the network RR in which the mobile terminal TM is to be found at a given time. The location zone includes a Mobile Services Switching Center MSC that is connected firstly via a Base Station Controller BSC to a Base Transceiver Station BTS connected via a radio link to a mobile terminal TM, and secondly to a local telephone exchange of a Public Switched Telephone Network (PSTN) RTC.

As is known, the network RR also includes a Home Location Register HLR connected to a plurality of Visitor Location Registers VLRs, including the VLR connected to the Mobile Services Switching Center MSC of the location zone in question. The Home Location Register HLR is analogous to a database which, for each user, contains, in particular, an International Mobile Subscriber Identity (IMSI) attached to the user and to the user card CU, the subscription profile of the user, and the number of the VLR to which the mobile terminal TM is attached momentarily. The VLR acts as a relay for the HLR in the location zone and contains the characteristics of those users whose mobile terminals are situated in the location zone.

A server SOP, as a service entity of the invention, is managed by the operator of the radio-communications network RR.

As shown in FIG. 1, the operator server SOP interchanges data messages with the mobile terminal TM via a Short Message Service (SMS) centre or server SC. The server SC has a gateway for communicating with the operator server SOP via a high data rate Packet Switched Network (PSN) RP, in particular the Internet, or in a variant, an Intranet, and another gateway for communicating with at least the above-mentioned Mobile Services Switching Center MSC, often via an access network RA such as an X.25 Packet Switched Network, or an Integrated Services Digital Network (ISDN) or an Asynchronous Transfer Mode (ATM) network. The packets transmitted by the operator server SOP are formatted in the server controller into short messages (SMS messages) transmitted to the mobile terminal TM; conversely, SMS messages transmitted by the mobile terminal TM are routed via the server SC in the form of packets addressed to the operator server SOP.

In a variant, the server SC is connected directly to or is incorporated in the MSC.

In the invention, the operator server SOP receives a removable security module MS that is preferably a smart card, i.e. a card with a chip. The security module MS contains, in a memory, an International Mobile Equipment Identity (IMEI) of the mobile terminal TM and personal data DP specific to the set constituted by the mobile terminal TM and by the user card CU. The IMEI includes, in particular, a manufacturer code. The personal data DP can be modified by the operator and can, in particular, include at least a portion of the IMEI of the terminal, an operator code COP of the operator of the network RR who is to market the mobile terminal with the user card, a country code of the country in which the network RR of the operator is located, an unlocking parameter DEV in order to activate unlocking of the mobile terminal, or, for other circumstances, a locking parameter, and/or various other parameters for controlling actions in the terminal. The security module MS also contains algorithms AS, AA, and CH that are defined below.

As explained below in the description of the method of the invention for unlocking a mobile terminal, the operator server SOP essentially serves to interchange messages with the mobile terminal TM, while the security module essentially serves to process data contained in the interchanged messages.

Similarly, the SIM card securely provides interchange of messages with the remote operator server SOP via the mobile terminal which is transparent to such interchange, and thus inserts terminal control parameters into messages to be transmitted and extracts parameters from messages received for the terminal.

In a first variant, the SMS server SC and the access network RA are replaced with an access network of the Packet Switched Network type with mobility and access being managed by radio via the General Packet Radio Service (GPRS). The Packet Switched Network RP is then connected at a Gateway GPRS Support Node (GGSN) to the GPRS network, and the Base Station Controller BSC is connected via a Serving GPRS Support Node (SGSN). The advantage of this variant is to transmit messages in packet form with data rates that are significantly higher.

In a second variant, the operator server SOP is connected directly to or is incorporated in the Home Location Register HLR, thereby enabling the server SOP to enjoy direct use of the data stored in the HLR.

In yet another variant, the cellular radio-communications network RR is a third-generation network, i.e. a Universal Mobile Telecommunications System (UMTS) network. In which case, the user card CU is a Universal SIM (USIM), and the BSC together with the BTS are grouped together in the UMTS Terrestrial Radio Access Network (UTRAN) of the UMTS network.

Figure 2:
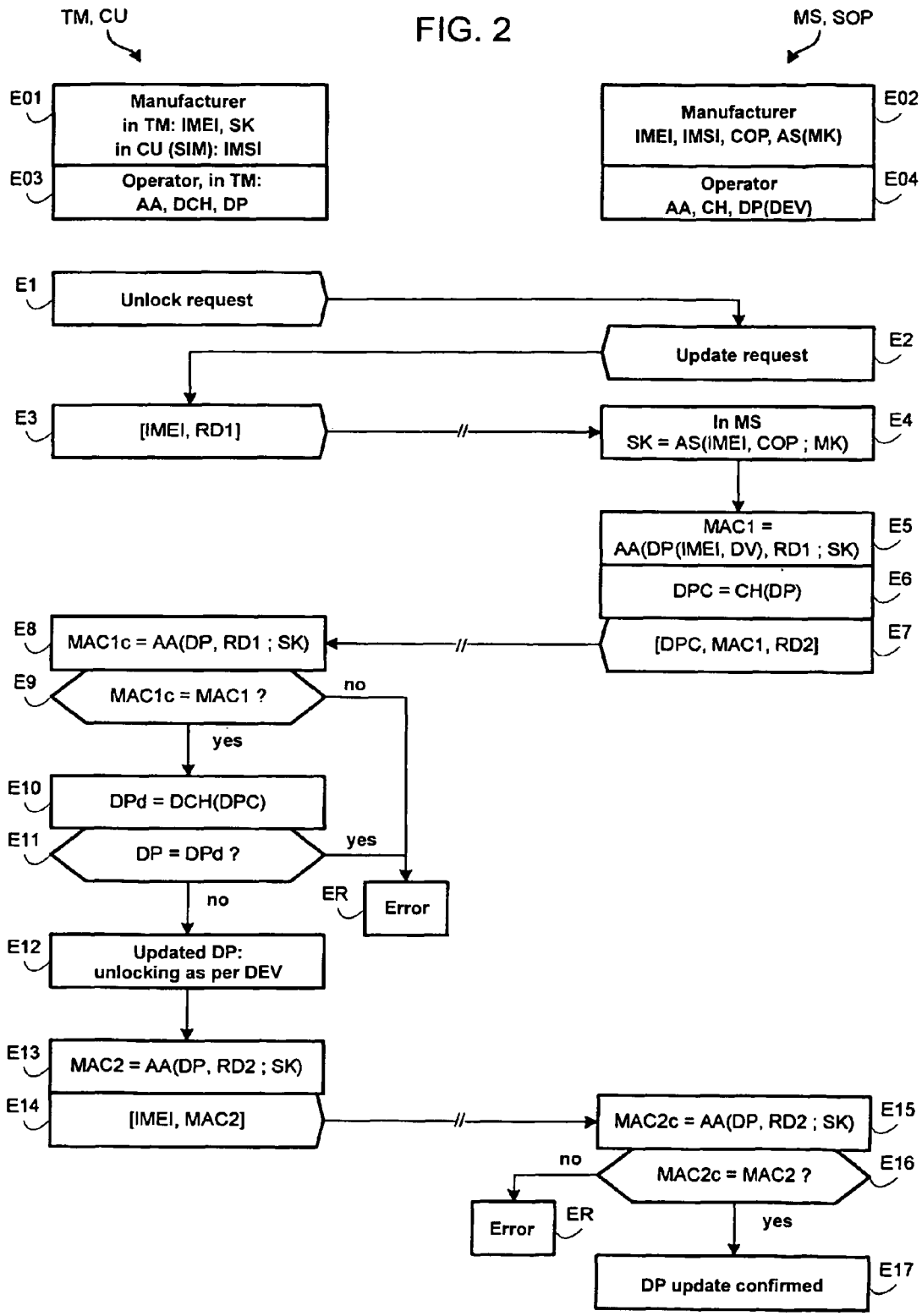
FIG. 2 is an algorithm of the main steps of a preferred first implementation of the unlocking method of the invention.

In a first implementation shown in FIG. 2, prior to the sale and to the use of the mobile terminal TM with the smart card CU, the unlocking method of the invention includes four initial steps E01 to E04 which are executed on the premises of the mobile terminal manufacturer and on the premises of the operator of the network RR who has ordered a batch of mobile terminals equipped with smart cards from the manufacturer.

In step E01, the manufacturer inputs confidential data specific to the card CU and to the mobile terminal TM containing the card CU, such as the IMEI and the IMSI respectively including a manufacturer code and an operator code COP specific to the operator of the network RR. The manufacturer also records in the mobile terminal TM a secret key SK which results from applying the IMEI of the terminal and the operator code COP to a security algorithm AS with a mother key MK. The security algorithm AS with the mother key MK is the property of the mobile terminal manufacturer and is unknown to the radio-communications operator.

In step E02, for each mobile terminal TM with a user card CU of the batch ordered by the operator from the manufacturer, the manufacturer records in the security module MS and in association with the terminal identity IMEI the operator code COP, the user identity IMSI, and the security algorithm AS with the mother key MK. The security algorithm AS is, for example, of the Advanced Encryption Standard (AES) type.

Then the manufacturer delivers the batch of mobile terminals that have been loaded with the various above-mentioned parameters during step E01 with the removable security module MS to be inserted in the operator server SOP to the operator of the radio-communications network RR.

In step E03, the operator installs in each terminal of the batch delivered an authentication algorithm AA that has as its key the secret key SK, a deciphering algorithm DCH, and at least one unlocking application. The authentication algorithm AA is the property of the operator and is unknown to the manufacturer, as, conversely, the algorithm AS is designed to be secret by the manufacturer and is thus unknown to the operator. The deciphering algorithm DCH serves to decipher data enciphered by the enciphering algorithm CH and transmitted by the server SOP. The unlocking application can depend on personal data DP stored in the terminal in step E03 and modifiable by the operator. The unlocking application requires the future user US of the terminal TM to communicate only via the radio-communications network RR of the first operator who sold the terminal to the user, for a predetermined locked term, typically a six-month term.

In step E04, the operator also installs the authentication algorithm AA that has as its key the secret key SK and the deciphering algorithm DCH, and preferably records the personal data DP with the unlocking parameter DEV in the security module MS, or, in a variant, in the server SOP.

The operator then markets the batch of mobile terminals and, in particular, sells a mobile terminal TM with a user card CU to a user US. The user US uses the mobile terminal for the predetermined locked term by communicating via the radio-communications network RR of the operator.

On expiry of the predetermined locked period, the user US might wish to unlock the mobile terminal TM so as to use it over the radio-communications network of another operator. In order to unlock the mobile terminal, steps E1 to E17 shown in FIG. 2 are executed in the first implementation of the unlocking method of the invention.

In step E1, the user US selects unlocking of the mobile terminal TM in a menu displayed thereon. An unlock request message is then transmitted by the mobile terminal TM to the operator sever SOP and is, in the implementation shown in FIG. 1, in the form of an SMS message which is then transformed by the SMS server into a packet transmitted via the Packet Switched Network RP. The server SOP then sends an update request to the mobile terminal TM, via the networks RP, RA, and RR in the implementation shown in FIG. 1, in step E2. In response to the update request, the mobile terminal TM transmits a message including the terminal identity IMEI and a first random number RD1 to the security module MS in the server SOP, in step E3. The first random number RD1 is generated by a pseudo-random generator included in or connected to the microcontroller of the terminal TM.

In a variant, step E1 is omitted and the operator server SOP itself decides, after expiry of the predetermined locked term, to send the update request to the mobile terminal TM. For example, the update request is sent by the server SOP in response to a location update request for updating the location of the mobile terminal, or after an authentication request, or indeed after the mobile terminal is switched on and during the procedure for attaching it to its location zone in the radio-communications network RR.

After receiving the identity IMEI and the random number RD1, the security module MS determines various parameters in the next steps E4 to E6.

In step E4, the received mobile terminal identity IMEI and the operator code COP are applied with the mother key MK to the security algorithm AS in order to generate the daughter secrete key SK specific to the mobile terminal.

In the next step E5, the module MS determines a first authentication code MAC1 deduced from the personal data DP and from the received random number RD1 by applying said personal data and said received random number to the authentication algorithm AA having the secret key SK as its key.

Thus, the secret key SK specific to the manufacturer and the personal data DP including the terminal identity IMEI and specific to the radio-communications operator contribute concomitantly to authenticating the personal data DP and to making it secure, without the operator knowing the secret key SK and without the manufacturer knowing the personal data DP.

Then, the personal data DP is enciphered by the enciphering algorithm CH into enciphered personal data DPC, in step E6. The server SOP establishes a message including the enciphered personal data DPC, the message authentication code MAC1 and a second random number RD2 in step E7. This message is transmitted to the mobile terminal TM over the networks RP, RA, and RR. The random number RD2 can be generated by a pseudo-random generator included in the server SOP or optionally in the security module MS.

In response to the message transmitted by the server SOP in step E7, the mobile terminal TM computes a message authentication code MAC1c in step E8. The code MAC1c results from applying the personal data initially stored in step E03 and the random number RD1 generated and stored in step E3 to the authentication algorithm AA with the secret key SK initially stored in the mobile terminal in step E01. In the next step E9, the mobile terminal TM compares the computed message authentication code MAC1c with the message authentication code MAC1 transmitted by the server SOP.

If the two authentication codes are equal, the mobile terminal deciphers the enciphered personal data DPC transmitted by the server SOP by applying them to the deciphering algorithm DCH and generates deciphered personal data DPd, in step E10. The mobile terminal TM compares the personal data initially stored in step E03 with the deciphered personal data DPd, in step E11. If the terminal identity IMEI or a portion thereof is recognized in the personal data and if the compared items of personal data differ typically by the presence of the unlocking parameter DEV in the deciphered personal data DPd, the mobile terminal TM applies the unlocking parameter DEV to the unlocking application which updates the personal data in step E12 so that the mobile terminal TM can be used for communicating with any other operator, i.e. an operator other than the first operator, if the user so desires.

Conversely, if the two compared authentication codes MAC1c and MAC1 are different in step E9, and/or the compared items of personal data DP and DPd are identical in step E11, the personal data DP is not modified in the mobile terminal TM which generates an error message, as indicated in a step ER. The error message is transmitted to the operator server SOP which interprets it as a malfunction of the terminal TM and/or of the user card CU, and the terminal TM is not unlocked. The error message can also be indicated to the user by appropriate display on the screen of the mobile terminal in order to invite the user US to go to a point of sale of the operator.

In a variant, the steps E10 and E11 are omitted, and the terminal TM interprets at least a portion of the personal data if it is transmitted in step E7 in order to execute step E12.

Preferably, the unlocking method includes steps E13 to E17 so that the updating of the personal data DP after the step E12 and in particular the unlocking of the terminal are acknowledged by the operator server SOP.

In step E13, the mobile terminal TM determines a second message authentication code MAC2 resulting from applying the updated personal data DP and the random number RD2 to the authentication algorithm AA provided with the secret key SK. The random number RD2 was generated and stored by the security module MS in step E7, and it was transmitted with the enciphered personal data DPC and the first message authentication code MAC1 to the mobile terminal.

Via the user card, the mobile terminal TM transmits a message including the terminal identity IMEI and the authentication code MAC2, and addressed to the operator server SOP, in step E14.

In step E15, in response to said message, the security module MS in the operator server SOP applies the personalized data initially stored in step E04 in correspondence with the received identity IMEI and the random number RD2 to the authentication algorithm AA with the secret key SK, and generates a computed message authentication code MAC2c. The security module compares the computed authentication code MAC2c with the transmitted authentication code MAC2, in step E16. if the compared authentication codes are identical, updating of the personalized data in the mobile terminal TM is confirmed and the method is stopped at step E17.

However, if the authentication codes compared in step E16 are different, an error step ER is executed so as, optionally, to indicate to the user that the mobile terminal TM is unlocked but malfunctioning.

Figure 3:
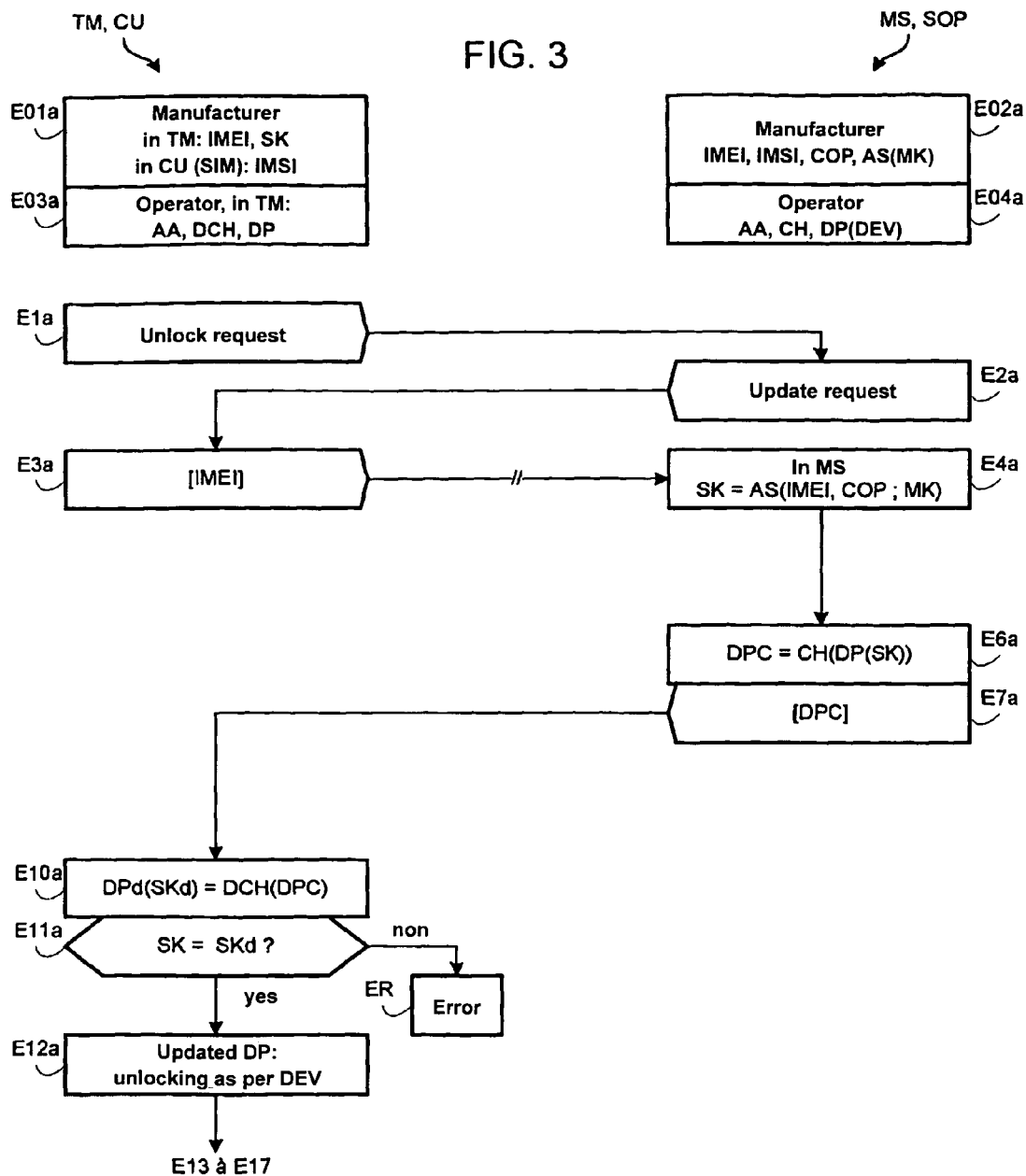
FIG. 3 is an algorithm of the main steps of a simpler second implementation of the unlocking method of the invention.

In a second implementation that is shown in FIG. 3, that is simpler than the first implementation, and that can be developed before the first implementation, the mobile terminal TM does not contain an authentication algorithm AA. The steps for the second implementation are designated by references ending with the letter a.

Steps E01a to E04a are modified only by the absence of installation of the authentication algorithm AA in the mobile terminal TM and in the security module MS, in the initial operator steps E03a and E04a.

The second implementation differs from the first implementation essentially by the next modified steps, after expiry of the locked term, when the user US wishes to unlock the mobile terminal TM so as to have the possibility of using it over the radio-communications network of another operator. In order to unlock the mobile terminal, at least the modified steps E1a to E12a shown in FIG. 3 are executed, without the steps E5, E8, and E9 of the first implementation.

After the steps E1a and E2a, or, in a variant, after step E2a only, the mobile terminal TM responds to the update request by transmitting a message including the terminal identity IMEI, without a random number RD1, to the security module MS in the server SOP, in step E3a.

After receiving the identity IMEI, the security module MS applies the received mobile terminal identity IMEI and the operator code COP to the security algorithm AS with the mother key MK so as to generate the daughter secret key SK that is specific to the mobile terminal TM, in step E4a. The secret key SK acts as the unlocking code.

In the next step E6a, the personal data DP supplemented by the secret key SK, or in a simpler variant, the secret key SK only, is enciphered by the enciphering algorithm CH into enciphered personal data DPC. The server SOP establishes a message including the enciphered personal data DPC in step E7a. This message, which is very small compared with the message of the first implementation, is transmitted to the mobile terminal TM over the networks RP, RA, and RR.

In response to said message, the mobile terminal TM deciphers the enciphered personal data DPC transmitted by the server SOP by applying it to the deciphering algorithm DCH and generates deciphered personal data DPd including a deciphered secret key SKd, in step E10a. The mobile terminal TM compares the secret key initially stored in step E01a with the deciphered secret key SKd and optionally compares the other personal data initially stored in step E03a with the other deciphered personal data Dpd in step E11a. If the compared secret keys are identical and the optionally compared items of personal data differ typically by the presence of the unlocking parameter DEV in the deciphered personal data DPd, the mobile terminal TM applies the unlocking parameter DEV to the unlocking application which updates the personal data in step E12a. The mobile terminal TM can then be used to communicate with any other operator, i.e. an operator other than the first operator, if the user so wishes.

In the above-mentioned simpler variant, the mobile terminal TM compares only the initially stored secret key with the deciphered secret key SKd in step E11a, and activates the unlocking application when the compared secret keys are identical in step E12a.

In the other cases, the terminal TM remains locked, any personal data DP is not updated, and the mobile terminal TM generates an error message, as indicated in a step ER.

In a more comprehensive second implementation, the unlocking method includes steps E13 to E17, as shown in FIG. 2, for having the updating of the personal data DP after the step E12a and in particular the unlocking of the terminal acknowledged by the operator server SOP. A random number RD2 is then generated and stored by the security module MS in step E7a and transmitted with the enciphered personal data DPC to the mobile terminal.

The invention claimed is:

1. A method of unlocking a mobile terminal which, prior to being used, is assigned to a radio-communications network managed by an operator, and has stored in a memory a secret key resulting from applying an identity of the mobile terminal and a code of the operator to a security algorithm, the method comprising the following steps:

prior to use of the mobile terminal in said network:
storing in the memory the identity of the mobile terminal
implementing the security algorithm in a security module, said security algorithm being unknown to the operator, and
inserting the security module into a service entity that is managed by the operator and that communicates with the mobile terminal via at least the radio-communications network; and after a predetermined term of use of the mobile terminal in said network:
in the security module, determining a secret key resulting from applying the terminal identity transmitted by the mobile terminal and the code of the operator to the security algorithm after an update request has been transmitted by the service entity,
transmitting the enciphered determined secret key to the mobile terminal over the radio-communications network, and
deciphering in the mobile terminal the enciphered secret key, and comparing the deciphered secret key with the stored secret key so as to unlock the mobile terminal when the compared secret keys are identical.

2. A method according to claim 1, in which personal data, including the determined secret key and a parameter, is transmitted enciphered from the service entity to the mobile terminal and is deciphered in the mobile terminal so as to activate unlocking of the mobile terminal that is dependent on the parameter when the compared secret keys are identical.

3. A method according to claim 1, further comprising the following steps:
in the security module, applying personal data and a first random number, transmitted with the terminal identity by the mobile terminal, to an algorithm having as its key the determined secret key so as to generate a first message authentication code in order to transmit the enciphered personal data and the message authentication code from the service entity to the mobile terminal; and
in the mobile terminal, generating a first message authentication code, comparing the generated and transmitted first message authentication codes instead of comparing the secret keys, and deciphering and interpreting the enciphered personal data when the compared authentication codes are identical.

4. A method according to claim 3, in which the personal data includes at least a portion of the identity of the mobile terminal and a parameter in order to activate unlocking of the mobile terminal that is dependent on the parameter when the compared authentication codes are identical.

5. A method according to claim 1, further comprising, after the predetermined term of use, transmitting an unlock request message from the mobile terminal to the security module so that the security module requests transmission of the identity to the terminal.

6. A method according to claim 3, further comprising the following steps:
generating a second random number in the security module and transmitting it with at least the secret key or a first message authentication code dependent on the secret key to the mobile terminal;
when the compared first message authentication codes are identical in the mobile terminal, generating a second message authentication code resulting from applying the personal data and the second random number to an algorithm having the secret as its key, and transmitting the terminal identity and the second message authentication code from the mobile terminal to the service entity; and
in the security module, generating a second authentication code and comparing it with the transmitted second authentication code.

7. A method according to claim 1, in which the service entity is a server managed by the operator and the security module is a smart card inserted removably into the server.

* * * * *